United States Patent [19]
Agrawal et al.

[11] Patent Number: 5,884,320
[45] Date of Patent: Mar. 16, 1999

[54] METHOD AND SYSTEM FOR PERFORMING PROXIMITY JOINS ON HIGH-DIMENSIONAL DATA POINTS IN PARALLEL

[75] Inventors: Rakesh Agrawal; John Christopher Shafer, both of San Jose, Calif.

[73] Assignee: International Business Machines Corporation, Armonk, N.Y.

[21] Appl. No.: 920,331

[22] Filed: Aug. 20, 1997

[51] Int. Cl.$^6$ .................................................. G06F 17/30
[52] U.S. Cl. ............................ 707/104; 707/2; 707/100
[58] Field of Search .................... 707/1, 5, 10, 100–105, 707/200–206; 364/282.1; 706/934

[56] References Cited

U.S. PATENT DOCUMENTS

| | | | |
|---|---|---|---|
| 5,121,494 | 6/1992 | Dias et al. | 395/600 |
| 5,345,585 | 9/1994 | Iyer et al. | 395/600 |
| 5,404,510 | 4/1995 | Smith et al. | 707/2 |
| 5,412,806 | 5/1995 | Du et al. | 707/2 |
| 5,423,035 | 6/1995 | DePrez | 395/600 |
| 5,542,073 | 7/1996 | Schiefer et al. | 395/600 |

OTHER PUBLICATIONS

T. Brinkoff et al., "Parallel Processing of Spatial Joins Using R–Trees", In Proc. of 12th Int'l Conference on Data Engineering, New Orleans, USA, Feb. 1996.

T. Brinkoff et al., "Efficient Processing of Spatial Joins Using R–trees", In Proc. of the ACM–SIGMOD Conference on Management of Data, Washington, D.C., May 1993.

E. Hoel et al., "Algorithms for Data–Parallel Spatial Operations", Technical Report CS–TR–3230, University of Maryland, Feb. 1994.

R. Agrawal et al., "Fast Similarity Search in the Presence of Noise, Scaling, and Translation in Time–Series Databases", Proceedings of the 21st VLDB Conference, Zurich, Switzerland, 1995, pp. 490–501.

N. Beckmann et al., "The R*–tree: An Efficient and Robust Access method for Points and Rectangles", ACM, 1990, p.. 322–331.

D.J. Dewitt et al., "The Gamma Database Machine Project", IEEE Transactions on Data and Knowledge Engineering, vol. 2, No. 1, Mar. 1990, pp. 44–63.

O. Günther, "Efficient Computation of Spatial Joins", Proceedings of the 9th International Conference on Data Engineering, Vienna, Austria, 1993, pp.1–27.

A. Guttman, "R–trees: A Dynamic Index Structure for Spatial Searching", ACM, 1984, pp. 47–57.

H.V. Jagadish, "A Retrieval Technique for Similar Shapes", ACM, 1991, pp. 208–217.

M. L. Lo et al., "Spatial Joins Using Seeded Trees", Presented at SIGMOD 94, Minneapolis, MN, may 1994, ACM, 1994, pp. 209–220.

"MPI: A Message–passing Interface Standard", Chapter 1, Unversity of Tennessee, Knoxville, Tennessee, May 5, 1994, pp. 1–14.

(List continued on next page.)

*Primary Examiner*—Thomas G. Black
*Assistant Examiner*—Ruay Lian Ho
*Attorney, Agent, or Firm*—Khanh Q. Tran

[57] ABSTRACT

A method and system for performing spatial proximity joins on high-dimensional points representing data objects of a database in parallel in a multiprocessor system. The method comprises the steps of: partitioning the data points among the processors; creating index structures for the data points of the processors in parallel; assigning the join operations to the processors using the index structures; and simultaneously redistributing and joining the data points in the processors in parallel based on a predetermined joining condition. An efficient data structure, $\epsilon$-K-D-B tree, is used to provide fast access to the high-dimensional points and to minimize system storage requirements. The invention achieves fast response time and requires minimum storage space by having structurally identical indices among the processors, assigning workload based on the join costs, and redistributing the data points among the processors while joining the data whenever possible.

49 Claims, 6 Drawing Sheets

OTHER PUBLICATIONS

J. Nievergelt et al., "The Grid File: An Adaptable, Symmetric Multikey File Structure", ACM, 1984, pp. 108–124.

J.M. Patel et al., "Partition Based Spatial–Merge Join", SIGMOD 1996, pp. 1–12.

J.T. Robinson, "The K–D–B*–Tree: A Search Structure for Large Multidimessional Dynamic Indexes", ACM, 1981, pp. 10–18.

T. Sellis et al., "The R*–Tree: A Dynamic Index for Multi-dimensional Objects", Technical Report UMI-ACS–TR–87–3, CS–TR–1795, University of Maryland, Feb. 1987, pp. 1–24.

METHOD AND SYSTEM FOR PERFORMING PROXIMITY JOINS ON HIGH-DIMENSIONAL DATA POINTS IN PARALLEL

CROSS-REFERENCE TO RELATED APPLICATIONS

The present invention contains materials related to a co-pending application for "Method and System for Performing Spatial Similarity Joins On High-Dimensional Points," by Agrawal et al., Ser. No. 08/629,688, filed Apr. 9, 1996, which is commonly assigned with this application and incorporated by reference herein.

FIELD OF THE INVENTION

The present invention relates generally to computer databases. More particularly, the present invention relates to a method for performing proximity joins on high-dimensional data points in parallel in a multiprocessor system.

BACKGROUND OF THE INVENTION

In computer database applications, proximity join operations involve the finding of data objects in a database that satisfy certain similarity requirements. Examples of these include query applications on multimedia databases, medical databases, scientific databases, and time-series databases. A typical user query of these applications may require the finding of all pairs of similar images, retrieving music scores similar to a target music score, determining products with similar selling patterns, or discovering all stocks with similar price movements from the database. Typically, the data objects (with their attributes) are represented as points in a multi-dimensional space to facilitate the search of the database to find similar data objects. With such a mapping between data objects and multidimensional points, the problem of finding similar objects in the database is reduced to finding points in the multi-dimensional space that are close, or similar, to a given point. This operation is referred to as a spatial proximity (or similarity) join. Two points are said to be in proximity of each other if they are within a certain distance, according to some metrics used to measure the distance. This distance is called a similarity distance and reflects the data attributes common to the two points.

In many emerging data-mining applications, such as those finding similar time-series, it is critical to process the proximity join queries efficiently in order to obtain the result quickly with minimum data storage requirements. Prior art algorithms for multi-dimensional proximity joins may be classified as non-index based or index based. The non-index based algorithms typically use space-filling curves to map objects into one-dimensional values. This is done by partitioning the space regularly into multiple cells. A space-filling curve is drawn through the multi-dimensional space with the cells numbered in the order they are visited. Objects to be joined are then examined sequentially, and for each cell that an object overlaps, a <cell-number, object-pointer> pair is created. Standard relational indices and techniques for computing joins can then be used on the pairs' one-dimensional cell values. Further details on non-index based algorithms may be found, for example, in "A Class of Data Structures For Associated Searching," J. A. Orenstein et al., Proc. of the ACM Symposium on Principles of Database Systems, 1984. A shortcoming of space-filling curves is that some proximity information is always lost, so nearby objects may have very different cell values. This in turn requires a complex join algorithm.

Most of the recent work in multi-dimensional joins has focused on using indices to aid the join operation. This includes the R-tree used in "Efficient Processing of Spatial Joins Using R-trees," by T. Brinkhoff et al., Proc. of the ACM SIGMOD Conference on Management of Data, May 1994, and the seeded trees described in "Spatial Joins Using Seeded Trees," by Ming-Ling Lo et al., Proc. of the ACM-SIGMOD Conference on Management of Data, May 1994. Whatever the index used, they all follow the same schema whereby two sets of multi-dimensional objects are joined by doing a synchronized depth-first traversal of their indices. Intersection joins are handled by joining any two index buckets that overlap. Likewise, proximity joins are handled by joining any two index buckets whose boundaries are sufficiently near.

Most of these approaches are not well suited to the particular problem of proximity joins on high-dimensional points because they cannot scale to a large number of dimensions. For example, the R tree and seeded tree both use a "minimum bounding rectangle" (MBR) to represent the regions covered by each node in the index. As the number of dimensions gets large, the storage and traversal costs associated with using MBRs increases. Another drawback of these methods is their lack of skew-handling capabilities. Skewed data can cause rapid growth in the size of the index structures and increases their cost. Some of these problems are addressed by the $\epsilon$-K-D-B tree described in the co-pending U.S. patent application Ser. No. 08/629,688 for "Method and System For Performing Spatial Similarity Joins On High-Dimensional Points," by Agrawal et al. Although the $\epsilon$-K-D-B tree does not have many overheads and provides a very fast index structure for the join operations, the method described there is primarily oriented to a single-processor environment and operates serially. It fails to take advantage of the parallelism of a multiprocessor environment in building the index structure and performing the joins.

Virtually all of the existing work on parallelizing multi-dimensional joins has focused on joining two-dimensional geometric objects. For example, in "Parallel Processing Of Spatial Joins Using R-trees," T. Brinkhoff et al. use R-trees to join spatial objects in a hybrid shared-nothing/shared-memory architecture where a single data processor services all I/O requests. In "Algorithms For Data-Parallel Spatial Operations," E. G. Hoel et al. compare data-parallel quadtrees with data-parallel R- and R +-trees for joins and range queries on two-dimensional line segments. However, neither of these approaches deal with a pure shared-nothing multiprocessor architecture or with data spaces larger than two dimensions. Another approach to the parallel join problem is to regularly divide the data space into N or more partitions (where N is the number of processors in the system) and assign the partitions to different processors. See, for instance, "Partition-Based Spatial-Merge Join," by J. M. Patel et al., Proc. of the ACM SIGMOD Conference On Management of Data, June 1996. Here, after the space is partitioned, data is redistributed accordingly and each processor executes its joins independently. A disadvantage of this approach is that workload partitioning is performed before we know what the data looks like, which may lead to a significant workload imbalance.

Thus, there is still a need for a method for performing spatial proximity joins on high-dimensional points in parallel in a multiprocessor system that takes advantage of the system's parallelism to efficiently build the index structure and perform the joins, with a minimum amount of storage space.

SUMMARY OF THE INVENTION

It is an object of the present invention to provide a method for performing spatial proximity joins on high-dimensional points in parallel, in a multiprocessor system.

Another object of the present invention is to provide index structures for efficiently representing and accessing the data points to be joined, where the index structures are created in parallel by the processors using the processors' local data.

Still another object of the present invention is a method for performing spatial proximity joins on high-dimensional points in parallel with a short execution time and minimum data storage requirements.

The present invention achieves the foregoing and other objects by providing a method for performing spatial proximity joins on data points in parallel, by finding pairs of points within a similarity distance of each other according to some similarity metrics. The high-dimensional points represent data objects in a database from which similar data objects are to be found. In accordance with the invention, the data points are first distributed among the processors. Each processor generates an index structure for its local data points, which typically has a root node that branches into interior nodes and terminates with its leaf nodes. Each leaf node is associated with a subset of points in the high-dimensional space. Next, the join operations are assigned to the processors based on the join costs, which can be estimated from the size of the leaf nodes involved in the operations. The data points are redistributed among the processors so that each processor has all the data required for its joins. At the same time, each processor executes its joins whenever all the data points necessary for the joins are present at the processor, in parallel with the other processors' data redistribution and joining.

In accordance with the invention, the index created by each processor is a multi-dimensional $\epsilon$-K-D-B tree. In generating the $\epsilon$-K-D-B tree, any of the tree's leaf node is split into $\lfloor 1/\epsilon \rfloor$ child nodes whenever the number of points in the leaf node exceeds a predetermined value, such that the width of each child node in the split dimension is $\epsilon$ or slightly greater than $\epsilon$. The splitting of a leaf node is typically based on the depth of the node, which is the distance between the root of the tree and the leaf node. For instance, if i is the depth of the leaf node, then the i-th dimension of the data structure may be used for splitting the node. To fully exploit the system's parallelism, the indices created by the processors are identical in structure so that each represents a portion of the overall index for the entire dataset. Preferably, the processors agree to a global order of dimensions for splitting their leaf nodes before actually creating the index trees. The order of the dimensions to be split may be determined based on any correlation between the dimensions so as to minimize system storage requirements during the joins.

The performance of the method for joining the points in parallel may be further improved by sorting the points in each leaf node on a dimension that is not used for splitting the nodes. The use of a common sort dimension eliminates the need for repeatedly sorting the points during the join operations. Furthermore, for each pair of leaf nodes from which data points are to be joined, the data points associated with the pair are sort-merged based on the common sort dimension.

To avoid structural discrepancies among the indices created by the processors, the method further includes the step of communicating the index structure by each processor to the other processors. Preferably, each processor broadcasts asynchronously to the other processors as to which leaf nodes in the index structure of the processor have recently been split.

Also, in accordance with the invention, the step of assigning the joins includes the step of, for each processor, traversing its index structure to join pairs of the structure's nodes. If both nodes of a pair are leaf nodes, then their data points are joined according to the joining condition. If only one of the two nodes is a leaf node, then the leaf node is joined with each child node of the non-leaf node. If neither of the two nodes is a leaf node, then the respective child nodes of the two nodes are joined. Also, each n-th child node of a first node is joined with the (n+1)-th child node of a second node, and each n-th child node of the second node is joined with the (n+1)-th child node of the first node. The value of index n varies from 1 to F-1, where F is the number of child nodes for each first and second nodes.

The step of traversing an index structure preferably includes the recursive self-joining of selected nodes of the structure by examining each node. If an examined node is a leaf node, then pairs of points from the node are joined. If it is not, then each child node of the examined node is joined to itself. Also, each pair of adjacent child nodes of the examined node is joined, according to the steps for joining pairs of nodes.

Additional objects and advantages of the present invention will be set forth in the description which follows, and in part will be obvious from the description and with the accompanying drawing, or may be learned from the practice of this invention.

DESCRIPTION OF THE PREFERRED EMBODIMENTS

The invention is primarily disclosed as a method for performing proximity joins on high-dimensional points in parallel in a multiprocessor system. However, persons skilled in the art will recognize that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Figure 1:
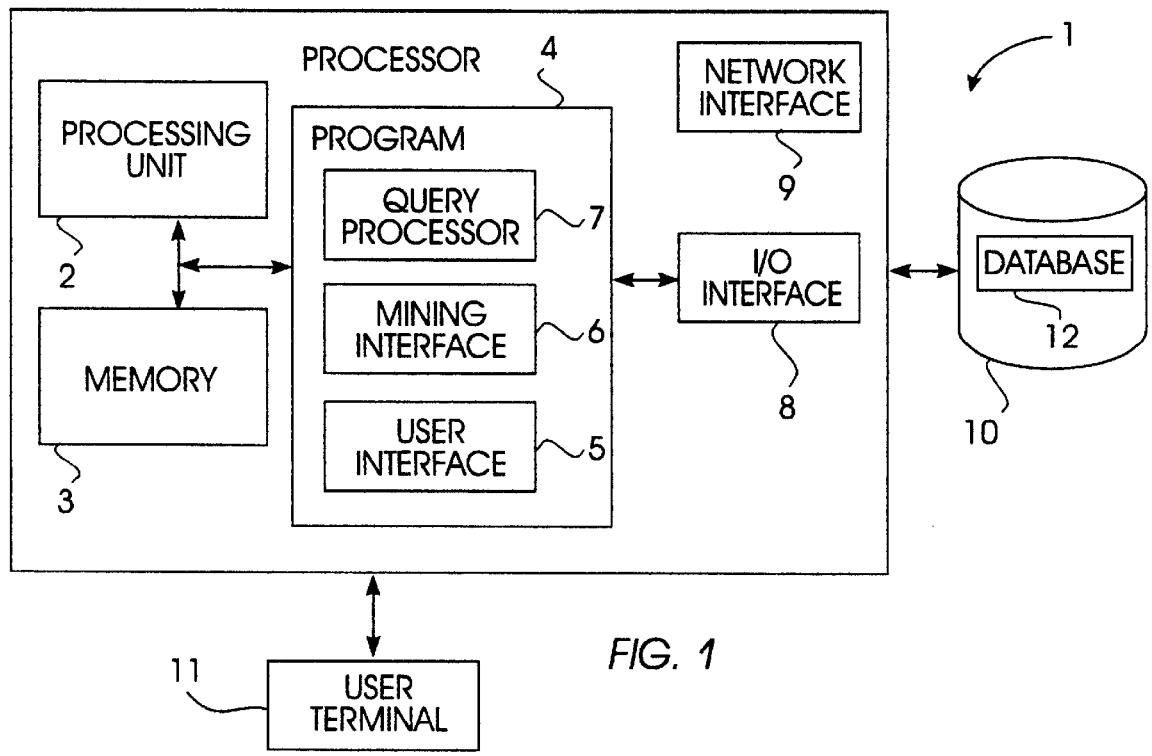
FIG. 1 is a block diagram of the components and interconnections of a single-processor computer used to perform join operations on data points of a database.

FIG. 1 shows the block diagram of a processor 1 (also referred to as a data processing system or computer) for performing join operations on databases, to extract desired relationships from the data. The processor 1 includes a processing unit 2 for executing predetermined instructions and manipulating the data, a memory 3 for storing the instructions and data during operation, and an input/output (I/O) interface 8 for communicating with a data storage device 10. The computer instructions are collectively referred to as a program 4 and may be stored on a medium such as a hard disk, CD-ROM, or retrieved from a remotely attached device (not shown). For a data-mining application, the program 4 typically includes a user interface 5 to communicate with a user terminal 11, a mining interface 6 which transforms a user query input into a required query language and returns results to the user interface 5, and a query processor 7 for processing the query on a database on the storage device 10. The processor 1 may also include a network interface 9 for communicating with other processors over a network such as a token-ring network (not shown).

Figure 2:
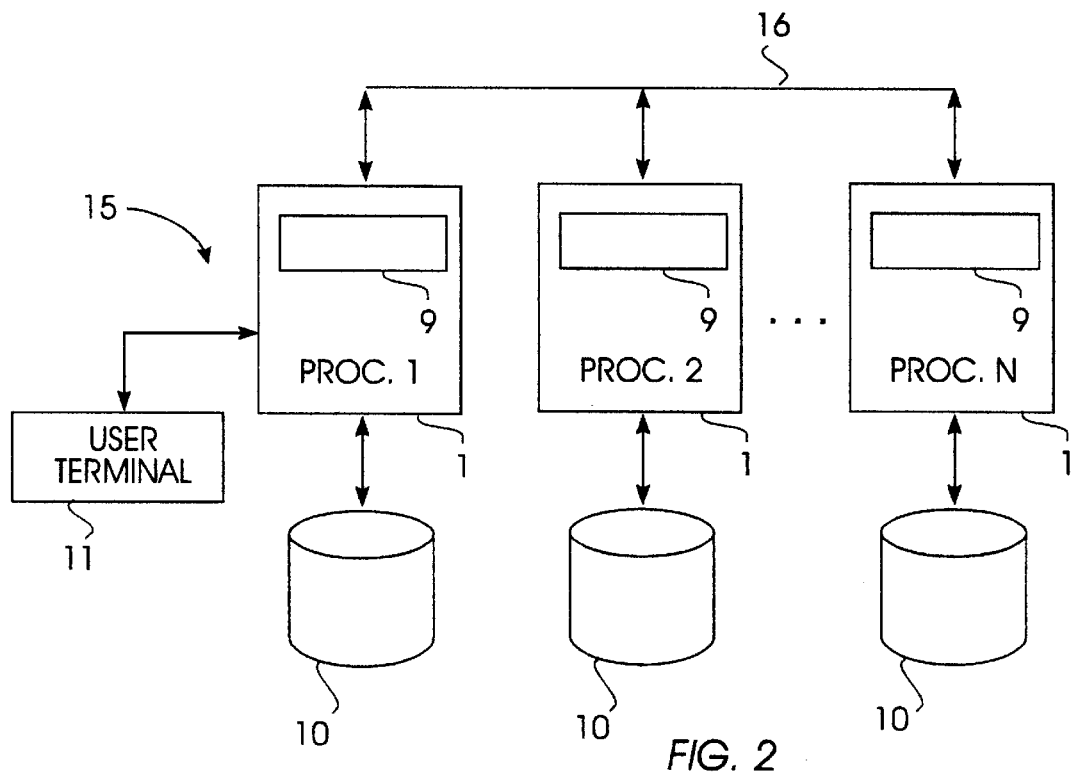
FIG. 2 is a block diagram of an exemplary multiprocessor system used to perform join operations on data points of a database in parallel, in accordance with the invention.

FIG. 2 shows a block diagram of a multiprocessor system 15 suitable for performing join operations in parallel in accordance with the invention. The system 15 includes N processors 1 connected to a common network 16 through their respective network interfaces 9, to allow the processors to communicate with each other. This inter-processor communication may be based a message passing protocol such as the Message-Passing Interface described in "*MPI: A Message-Passing Interface Standard*," May 1994. Each processor 1 of the system 15 preferably has its own data storage device 10 to minimize data traffic over the network 16. Examples of such a shared-nothing parallel configurations include the GAMMA system described in "*The GAMMA Database Machine Project*," D. J. Dewitt et al., IEEE Transactions on Knowledge and Data Engineering, pp. 44–62, 1990, and the SP2 system marketed by the IBM Corporation of New York. A user terminal 11 is typically attached to one of the processors 1 to allow the user to input a query and view its result.

Figure 3:
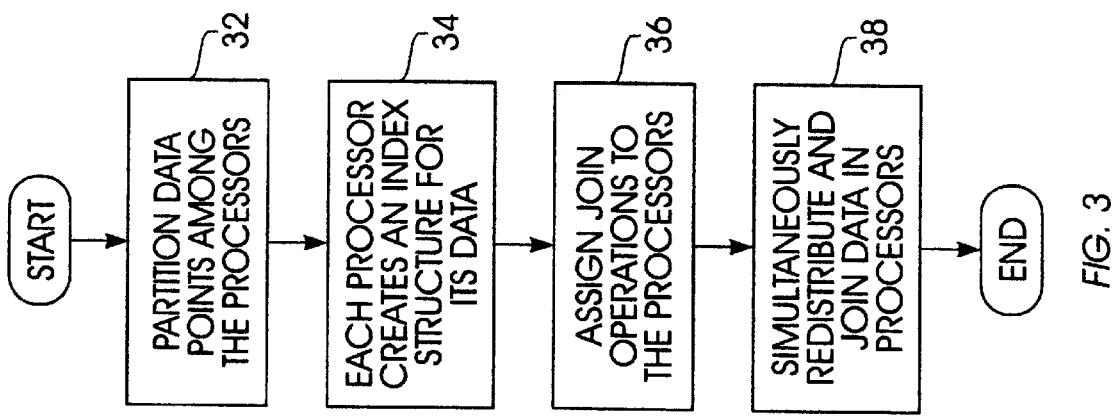
FIG. 3 is a flowchart of the overall operational sequence of performing join operations on data points of a database in parallel, in accordance with the invention.

FIG. 3 is a high-level flowchart showing the basic operation of the method for performing spatial proximity joins on high-dimensional points in parallel in accordance with the invention. The high-dimensional points represent the data attributes of data objects of a database from which similar data objects are to be found. For ease of explanation, but without any limitation intended thereby, the method will be described in the context of the system 15 described above. Beginning with step 32, the data points are first partitioned among the N processors 1 of the system. In general, the data points are partitioned evenly among the processors to maintain a balanced system workload.

In step 34, each processor 1 independently creates an index structure for the data points allocated to that processor. This index structure helps organize the local high-dimensional points to allow them to be efficiently accessed and determined whether or not they should be joined. The index structure will be described in more detail later in the specification, in reference to FIGS. 4–6. In step 36, the join operations are then assigned to the processors 1 using the index structures. Further details on how the joins operations are assigned to the processors are described below in reference to FIG. 7. Next, in step 38, the processors simultaneously redistribute the data points and perform the join operations whenever possible, in parallel and based on a predetermined joining condition, as described below in reference to FIG. 10.

Index Structures

An objective of the invention in performing proximity joins in parallel is to have an efficient index structure to handle the skewed data problem. Regardless of the data distribution over the processors of the system, it is desirable to have a data index structure that is relatively inexpensive to build (i.e., it can be built with minimum system resources) and organize data in groups of manageable and consistent sizes. In a preferred embodiment of the invention, each index structure is a tree data structure having a root node that branches into several child nodes. Each child node in turn branches in to other child nodes at the next level of the tree (i.e., a node's depth). The tree structure eventually terminates with its leaf nodes. The nodes between the root and leaves are called interior nodes. Initially, all of the data points in a processor 1 are associated with the root node of the respective index structure. As the structure grows in step 34, new leaf nodes are added to the tree where each leaf node corresponds to a subset of the data points local to that processor.

Figure 4:
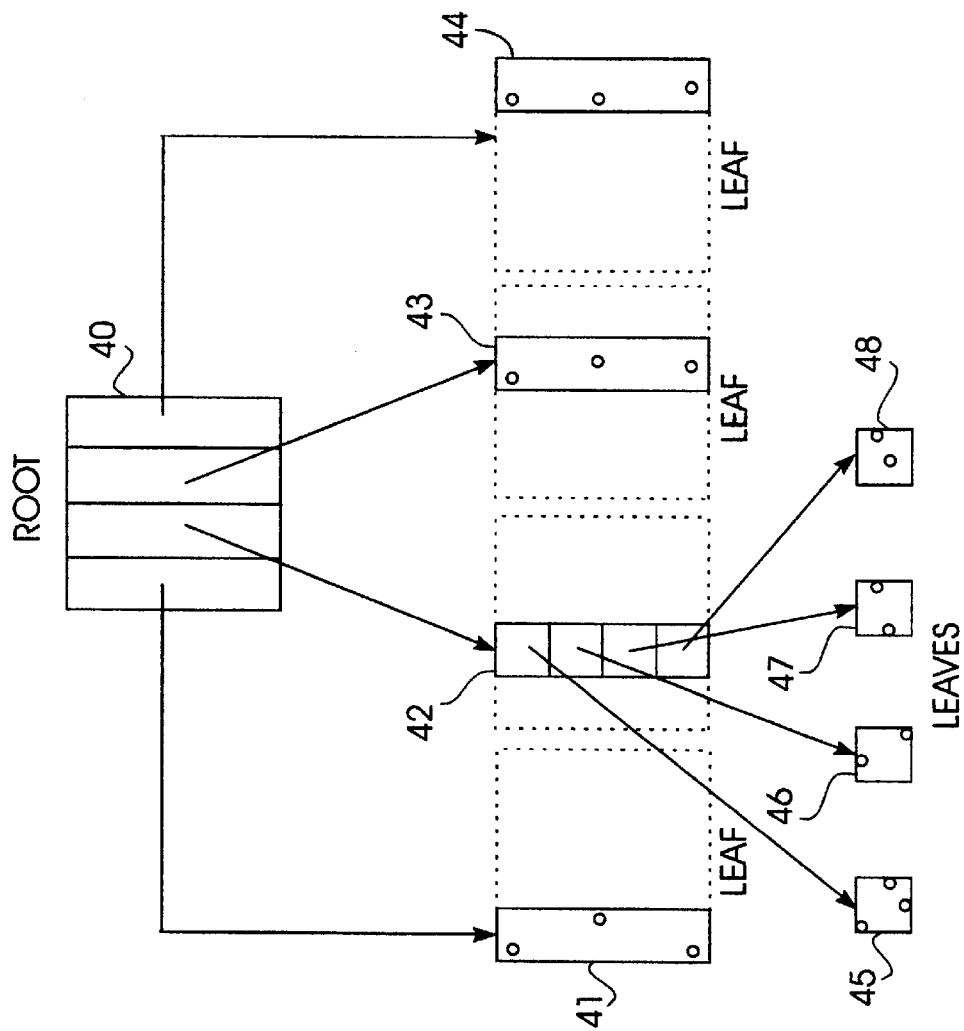
FIG. 4 shows a two-dimensional $\epsilon$-K-D-B tree that may be used for the index structure generated in step 34 of FIG. 3.

FIG. 4 shows a preferred embodiment for the index structure created by each processor 1 in step 34. The structure is a multi-dimensional $\epsilon$-K-D-B tree which can be constructed inexpensively by each processor and provides quick access to the data points in the join phase. During the generation of the tree structure, each leaf node is split into $\lfloor 1/\epsilon \rfloor$ child nodes whenever the number of points in the leaf node exceeds a predetermined threshold value. The splitting is typically based on the depth (or level) of the leaf node and such that the width of each new leaf node in the splitting dimension of the tree is either $\epsilon$ or slightly greater than $\epsilon$. For instance, if the leaf node is at a depth i, then the i-th dimension of the $\epsilon$-K-D-B tree is used for splitting the node. Without loss of generality, we may assume that the similarity distance $\epsilon$ is an exact divisor of 1 in describing the invention.

As an illustration, the $\epsilon$-K-D-B tree of FIG. 4 is shown in a two dimensional space, with a fanout of four; i.e., each non-leaf node has four child nodes. The root node 40 originally branches into four leaf nodes, 41 through 44. During the forming of the tree (step 34), if the number of points in leaf node 42 is determined to be exceeding a user-specified threshold for the tree, the node 42 is split into four child nodes, 45 through 48, which become the tree's new leaf nodes, while node 42 becomes an interior node.

Figure 5:
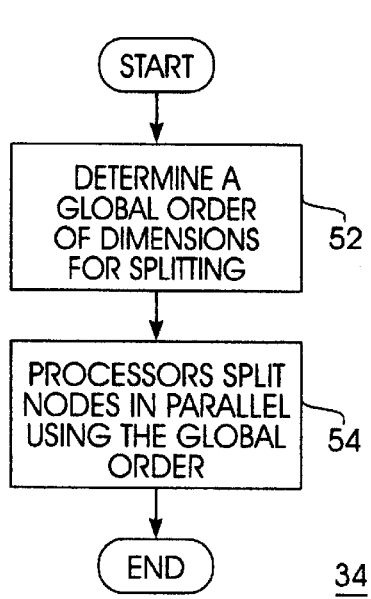
FIG. 5 is a flowchart of the operational sequence for an embodiment of step 34 of FIG. 3, for creating an index structure for the data points of each processor.

FIG. 5 shows a flowchart of the operational sequence for a preferred embodiment of step 34, for creating an index structure for the data points in each processor 1. To balance workloads among the processors, the structures are first built using the entire dataset before the join operations are assigned in step 36. This allows the workloads to be assigned on a detailed knowledge of the data distribution over the processors. Also, to fully exploit the system's parallelism, each processor independently creates an index structurally identical to the other indices, using its local data points. Each index thus represents a portion of a common global index for the entire set of data points. Since each processor holds only 1/N of all the data points, the indices will be smaller than if one had been built from the entire set of data.

In order to have the N processors build identically structured indices, we take advantage of the ϵ-K-D-B tree's use of global split ordering. Before the processors 1 begin building the indices, they determine and agree to a global order of the tree dimensions used for splitting the leaf nodes, as shown by step 52. This goal can be realized by having one of the processors acting as a coordinator which selects and communicates the split order to the others, or by having each processor choose a split order randomly, but starting with the same random seed. The processors then split their leaf nodes in parallel using the global split order in step 54. In a preferred embodiment of the invention, the selection of a split order is based on any correlation among the dimensions of the tree such that a dimension selected for splitting next has the least correlation with those previously used for splitting the leaf nodes.

Figure 6:
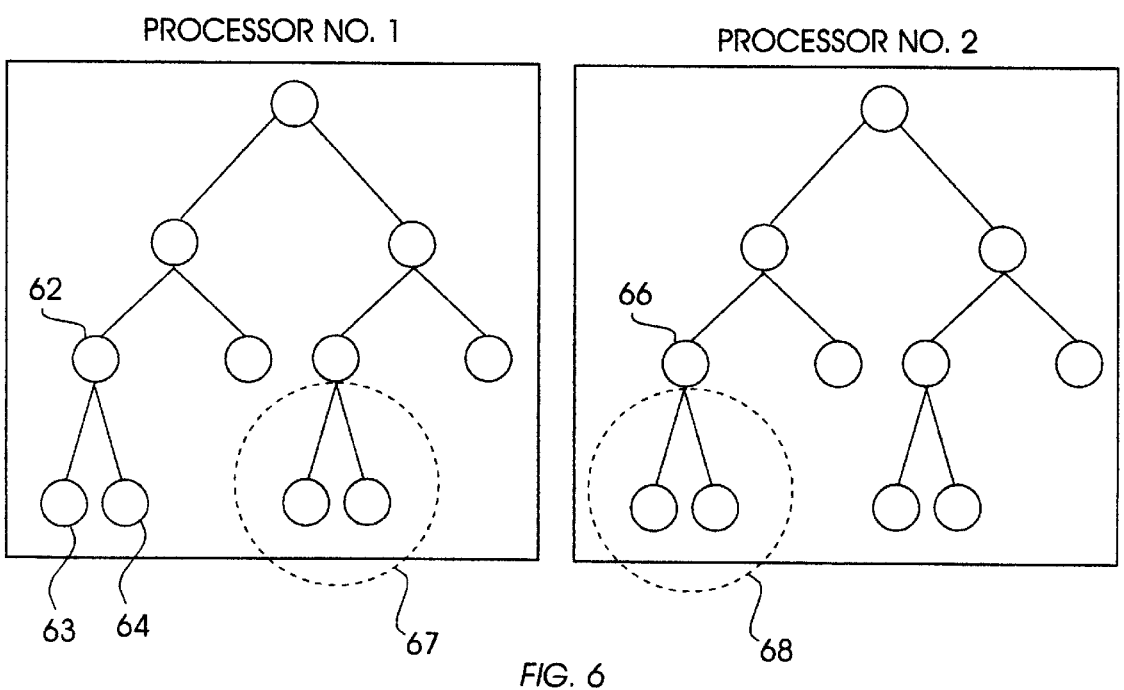
FIG. 6 shows the $\epsilon$-K-D-B index trees created by two processors of a system where the trees are identical in structure except for the splitting of two leaf nodes.

Since the data on each processor is different, there will be leaves on some processors which overflow and have to be split, but not on the other processors. An example of this situation is shown in FIG. 6, in which two processors 1 have built otherwise identical ϵ-K-D-B indices except that each processor has split a leaf node that the other has not. For example, node 62 of the index tree in processor No. 1 has been split into two leaf nodes 63 and 64, while node 66 of the index tree in processor No. 2 (which is in the same position as node 62) has not been split.

This structural discrepancy can be resolved by having each processor communicate its tree structure to the other processors at the end of the build process. Another approach is for the processors to periodically broadcast synchronous messages during the build phase indicating which leaves they have recently split. An advantage of the latter approach is that the processors receiving the message will be able to correctly split a node before it becomes full with data. Since messages are sent asynchronously and the order does not matter, this communication requires very little overhead. Regardless of the approach used, the processors 1 perform the specified splits upon receipt of a message. This is illustrated by the subtrees 67 and 68 in FIG. 6. Since the processors build structurally identical indices and work with equal amounts of the data, the cost of building the indices remain well balanced among the processors.

Assignment of Join Operations

Figure 7:
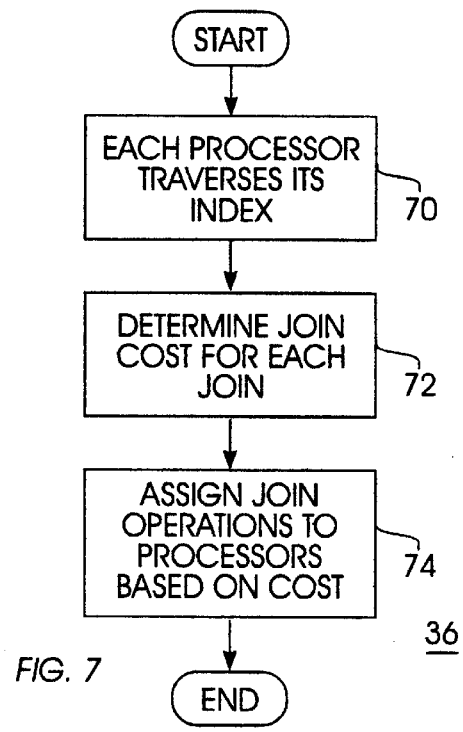
FIG. 7 is a flowchart of the operational sequence for an embodiment of step 36 of FIG. 3, for assigning the join operations to the processors using the index structures.

FIG. 7 is a flowchart representing the operational sequence of a preferred embodiment of step 36 of FIG. 3, for assigning the join operations to the processors 1, as described above. In step 70, each processor traverses its ϵ-K-D-B tree to determine a cost for each join operation involving its leaf nodes (step 72). The operations joins are then assigned to the processors based on the determined join costs in step 74. The cost of each join is preferably determined based a global size of the leaf nodes involved in the operation. Typically, each processor first builds a list of all joins that it needs to perform. It does this by performing regular joins with its local ϵ-K-D-B tree, but instead of actually joining the leaf nodes, it simply builds a list of all the joins that must be performed. These lists of join operations are then divided among the processors such that each has roughly the same amount of join work to perform. The cost of each join is estimated from the sizes of the leaf nodes. Note that each processor can build a join list on its own since the processors all have identical ϵ-K-D-B structures.

In deciding how to partition the joins among the processors, it is desirable to minimize the replication of data points in the processors and the communication among them when the joins are performed. One way to achieve this is to "cluster the joins" such that joins involving the same set of data buckets (leaf nodes) are assigned to a single processor. Join clustering can be achieved by processing and analyzing a join list, but this can be time-consuming. Instead, the ϵ-K-D-B tree indices can again be exploited to cluster the joins as follows. Note that a node in an ϵ-K-D-B tree can only join with the adjacent siblings of itself and its ancestors. Therefore, if the tree is traversed in a depth-first order, the join objects can be collected and stored with each leaf. These joins are then assigned to one processor. Once a full assignment is completed, it is set aside and the traverse of the tree is continued to collect joins for the next assignment. As the index tree is traversed to create assignments, the data leaves needed for each processor's join operations are also noted. Each processor performs this same workload-creation algorithm so that each will know which leaves to send to which other processors. However, aside from keeping a running count of assignment costs and noting which processor requires which set of leaves, a processor will only build its own assignment. Join operations that are assigned to other processors are simply deleted. Join operations that are a part of a processor's own assignment are left in the respective ϵ-K-D-B node.

Figure 8:
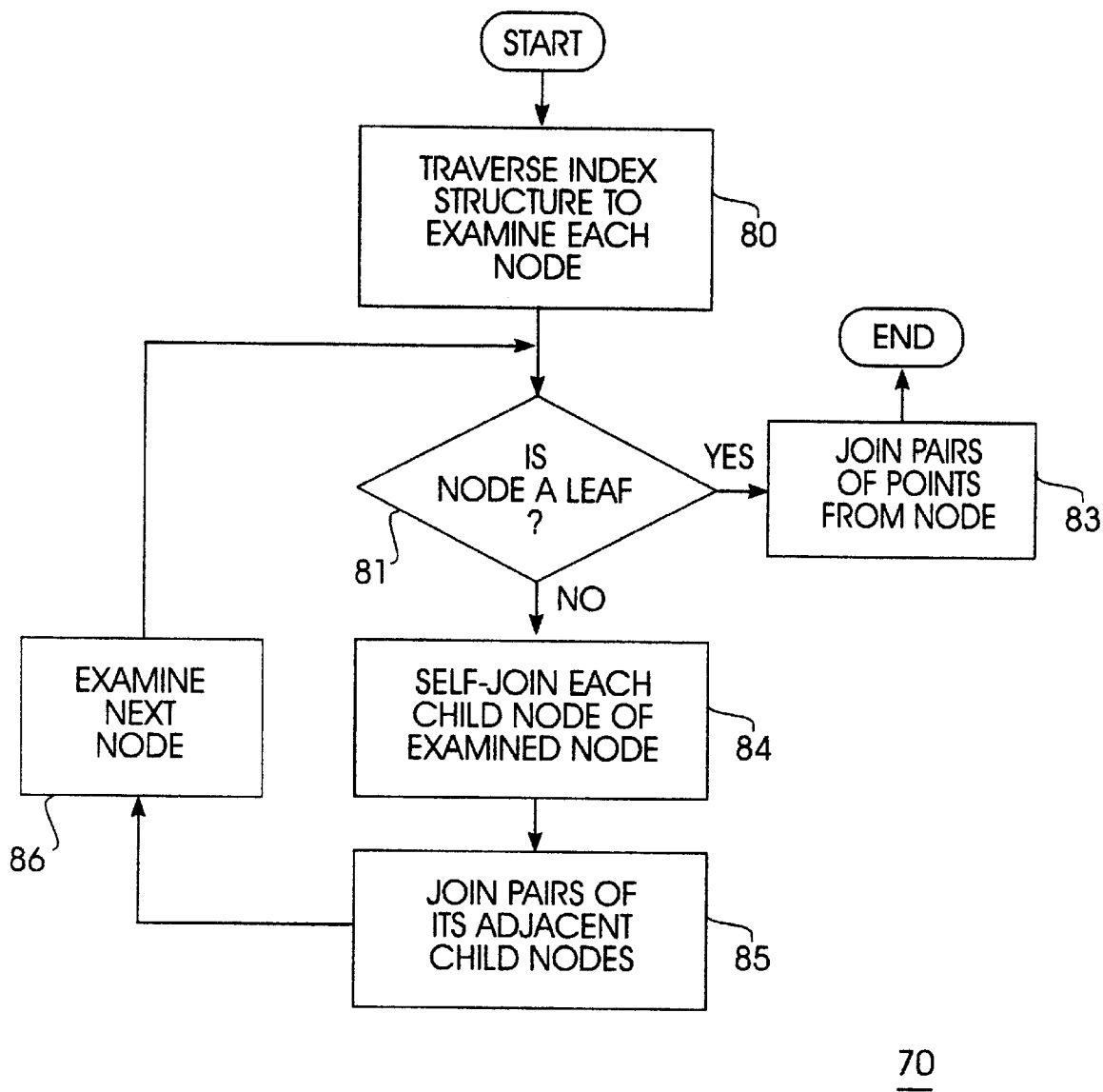
FIG. 8 is a flowchart showing the operational sequence for an embodiment of step 70, for joining data from the leaf nodes in the case of self-joins.

FIG. 8 is a flowchart showing the operational sequence for an embodiment of step 70, for traversing the index structure to determine join costs, in the case of self-joins. Starting from step 80, the tree is traversed to examine each of its nodes. In step 81, the node is checked to determine whether it is a leaf node. If the examined node is a leaf node, then pairs of points of the examined node are joined according to the specified joining condition, as shown by step 83. If it is not a leaf node, each of its child nodes is self-joined in step 84, i.e., the steps of FIG. 8 are recursively performed for each child node. Furthermore, each pair of adjacent child nodes of the examined node is joined in step 85, according to the steps for joining two nodes described in reference to FIG. 9 below. Next, in step 86, another node of the ϵ-K-D-B tree is examined, and the steps for self-joining are repeated for the newly examined node, beginning with block 81.

Figure 9:
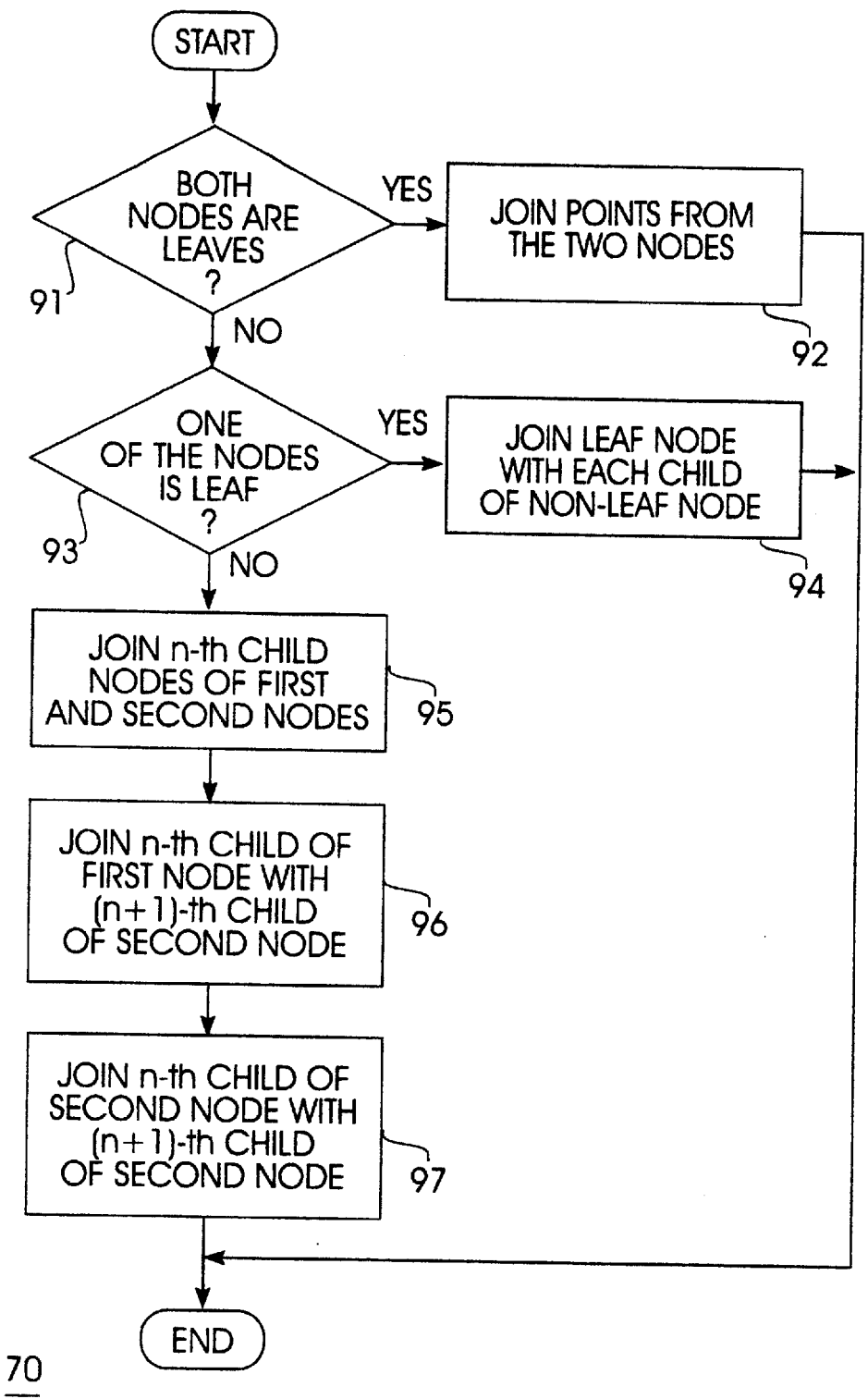
FIG. 9 is a flowchart showing the operational sequence for an embodiment of step 70, for joining data from the leaf nodes in the case of non-self joins.

FIG. 9 is a flowchart showing the operational sequence for an embodiment of step 70, for traversing the index structure to determine join costs, in the case of non-self joins. Starting with step 91, the two nodes are checked to determine whether they are leaf nodes. If so, they are selected for joining the data points from them in step 92. If only one of the two nodes is a leaf node, then the leaf node is joined with every child node of the non-leaf node in block 94, i.e., the steps of FIG. 9 are recursively executed to join the leaf node with each child of the non-leaf node. In the case where both nodes are non-leaf nodes, as shown by the negative branch from step 93, the child nodes of the two nodes are joined according to steps 95–97. First, in step 95, each n-th child node of the first node is joined with the corresponding n-th child node of the second node, recursively using the procedure for joining two nodes as currently described for FIG. 9. The value of index n changes from 1 to F, where F is the number of child nodes of each non-leaf node, i.e., the fanout of the ϵ-K-D-B tree. In step 96, each n-th child node of the first node is joined with the (n+1)-th child node of the second node, n being from 1 to F−1. Similarly, in step 97, each n-th child node of the second node is joined with the (n+1)-th child node of the first node, n being from 1 to F−1. The operations in steps 95–97 are typically implemented as recursive executions of the steps for joining two nodes, as currently described for FIG. 9.

Data Redistribution and Joining

Once the joins have been assigned, the processors begin redistributing the data asynchronously and execute the join operations whenever possible (step 38 of FIG. 3), i.e., whenever the data points satisfying the join condition are present in the respective processor. Since we do not want processors to flood the network by sending their entire dataset out at once, a control mechanism is implemented where each processor sends its data to each recipient in a depth-first order, using its index structure. This ensures that the processors do not have to wait too long between receipt of the two halves of a join, and serves to minimize the length of time each leafs data must be kept in the processors' memory. Thus, the total system memory used is kept to a minimum at any given time. Once a leaf's data has been redistributed and is no longer required for any of the processors join operations, the leaf node and its data points are deleted by the sending processor to free up its memory space. When all the data belonging to a leaf node has been received, the respective processor executes as many of the joins involving that leaf as possible.

The join operations performed in step 38 of FIG. 3 may be self-joins or non-self joins. A self-join is a join of the data in the same dataset. A non-self join is one between the data of two different datasets. To perform a self join of an $\epsilon$-K-D-B, the method traverses the tree from its root and recursively calls a self-join algorithm on each traversed child node. Also, each child is recursively joined with its right-adjacent sibling. Self-joins of leaves and joins between two leaves are performed by using sort-merge join. In a sort-merge join, the joining is typically done in two stages. Initially, the data points are sorted on one dimension of the tree. Next, for each point examined, other points whose values on the sort dimension are within $\epsilon$ distance of the examined point are considered to determine whether they are within the similarity distance of the examined point. Since it is unlikely that all dimensions will be used for splitting, a non-split dimension is used to sort the data points in the leaves to be joined. A typical implementation of the self-join(x) and join(x,y) algorithms are given as pseudo-code below.

To perform a non-self proximity join between two different datasets, an $\epsilon$-K-D-B index is built for each dataset using the same global split ordering. This will result in nearly identical index structures and makes non-self joins no more difficult to execute than self joins. Note that each $\epsilon$-K-D-B index is tailored to a specific value of $\epsilon$. However, since the index is inexpensive to build, generating an new index for each desired join is still beneficial.

Figure 10:
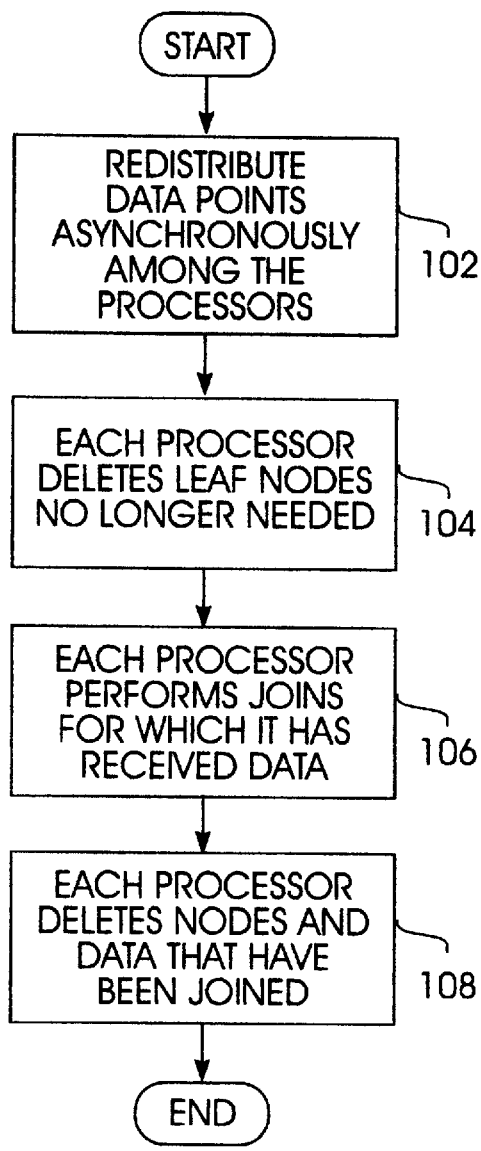
FIG. 10 is a flowchart showing the operational sequence of a preferred embodiment for step 38, for simultaneously redistributing and joining the data points.

FIG. 10 is a flowchart showing the operational sequence of a preferred embodiment for step 38, for simultaneously redistributing and joining the data points. Starting with step 102, the data points are redistributed asynchronously among the processors so that each processor has all the data points it needs to perform the assigned joins. To avoid having the processors wait too long for the required data, each will send data points to the others in a depth-first order using its index structure. Furthermore, to free up a processor's memory space, each processor also deletes any leaf nodes of the index structure that are no longer needed for the processor's join operations, in step 104. The processor then proceeds to join data from the leaf nodes for which it has received all the data points required the assigned joins, in step 106. The leaf nodes and the data points from which joins have been performed are then deleted in step 108. Note that a join is executed by a processor whenever the data points required for the join have been received by the processor. That is, the joins are performed in parallel by the processors during the redistribution of data among them, rather than after the redistribution.

The following pseudo-code illustrates a typical implementation of the self-join and non-self join according to FIGS. 8 and 9, respectively.

```
procedure Self-join(x)
begin
    if leaf-node(x) then
        leaf-self-join(x)
    else
        for i = 1 to f - 1 do begin
            Self-join(x[i]);
            Join(x[i], x[i+1]);
        end
end
procedure Join(x, y)
begin
    if leaf-node(x) and leaf-node(y) then
        leaf-join(x, y);
    else if leaf-node(x) then begin
        for i = 1 to f do
            Join(x, y[i]);
    end
    else if leaf-node(y) then begin
        for i = 1 to f do
            Join(x[i], y);
    end
    else begin
        for i = 1 to f - 1 do begin
            Join(x[i], y[i]);
            Join(x[i], y[i+1]);
            Join(x[i+1], y[i]);
        end
        Join(x[f], y[f]);
    end
end
```

The actual join process can be implemented using linked lists. For example, the joins to be performed by each processor may be stored in lists associated with each leaf node. Also, an object representing a join is stored with one of the leaves involved in that join. By examining a leaf's linked list of joins and checking if data for the other half of each join has been received, the join can be executed and the join object deleted. Otherwise, the join object is removed from its current list and appended to the linked list of the other leaf nodes. When the processor later detects that the leaf has finished collecting data, the join will then be performed. When all joins involving a leaf have been executed, that leaf and its data are deleted, as described above.

Using the foregoing specification, the invention may be implemented using standard programming or engineering techniques including computer programming software, firmware, hardware or any combination or subset thereof. Any such resulting program, having computer readable program code means, may be embodied or provided within one or more computer readable or usable media, thereby making a computer program product, i.e., an article of manufacture, according to the invention. The computer readable media may be, for instance, a fixed (hard) drive, disk, diskette, optical disk, magnetic tape, semiconductor memory such as read-only memory (ROM), etc., or any transmitting/receiving medium such as the Internet or other communication network or link. The article of manufacture containing the computer programming code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links, communication devices, servers, I/O devices, or any sub-components or individual parts of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system or computer sub-component embodying the invention and to create a computer system or computer sub-component for carrying out the method of the invention.

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A method for performing proximity join operations on high-dimensional data points in parallel in a multiprocessor system, the join operations being based on a similarity distance between any two data points, the method comprising the steps of:

partitioning the data points among the processors;

creating an index structure for the data points of each processor, the index structure having a plurality of leaf nodes each corresponding to a subset of the data points;

assigning the join operations to the processors using the index structures; and simultaneously redistributing and joining the data points in the processors in parallel based on a predetermined joining condition.

2. The method as recited in claim 1, wherein the step of assigning the joint operations includes the steps of:

determining a cost for each join operation; and assigning the join operations to the processors based on the determined costs of the join operations.

3. The method as recited in claim 2, wherein the step of determining a cost for each join operation includes the steps of:

traversing the index structures to determine a global size for each leaf node; and estimating the cost from the global sizes of the leaf nodes involved in the join operation.

4. The method as recited in claim 1, wherein:

the index structure is a multi-dimensional $\epsilon$-K-D-B tree having a root node branching into a plurality of interior nodes, the tree terminating with the leaf nodes; and the joining condition is such that the similarity distance between any two data points to be joined is at most $\epsilon$.

5. The method as recited in claim 4, wherein the step of creating an index structure includes the step of splitting each leaf node, in at least one dimension of the tree, into $\lfloor 1/\epsilon \rfloor$ child nodes whenever the number of points in the leaf node exceeds a predetermined value, each child node having a width greater than $\epsilon$ in the dimension used for splitting.

6. The method as recited in claim 5, wherein:

each leaf node of the $\epsilon$-K-D-B tree has a depth equal to one plus the number of interior nodes between the root node and leaf node; and the step of splitting a leaf node is based on the depth of the leaf node.

7. The method as recited in claim 5, wherein the step of splitting a leaf node includes determining an order of the dimensions used for splitting based on any correlation among the dimensions such that a dimension selected for splitting next has the least correlation with previously selected dimensions.

8. The method as recited in claim 7, wherein:

the multi-dimensional $\epsilon$-K-D-B trees for all the processors are structurally identical; and the processors have the same order of the dimensions used for splitting the leaf nodes.

9. The method as recited in claim 5, further comprising the steps of:

sorting the data points of each leaf node using a dimension not used for splitting the leaf nodes as a common sort dimension; and for each pair of leaf nodes from which data points are to be joined, sort-merging the data points associated with the pair based on the common sort dimension.

10. The method as recited in claim 1, further comprising the step of communicating the index structure by each processor to the other processors.

11. The method as recited in claim 1, further comprising the step of broadcasting asynchronously, by each processor to the other processors, as to which leaf nodes in the index structure of the processor have recently been split.

12. The method as recited in claim 1, further comprising the step of distributing the data points asynchronously among the processors so that each processor has all the data points for the joint operations assigned to the processor.

13. The method as recited in claim 12, wherein the step of distributing includes the step of sending the data points, by each processor to the other processors, in a depth-first order using the index structure of the processor.

14. The method as recited in claim 12, further comprising the step of deleting a leaf node in each processor if the leaf node is no longer needed for the join operations assigned to the processor.

15. The method as recited in claim 1, wherein the step of joining the data points includes the steps of:

each processor first joining the leaf nodes for which the processor has received the data points needed for the joint operations assigned to the processor; and deleting those leaf nodes and data points from which the join operations have been performed by the processor.

16. The method as recited in claim 1, wherein the step of assigning the join operations includes the step of traversing the respective index structure for each processor to determine the join operations that will be performed by the processor.

17. The method as recited in claim 16, wherein:

the index structure is a tree structure having a root node branching into a plurality of child nodes and terminating with the leaf nodes; and the method further includes the step of joining a first node and a second node, the step of joining a first node and a second node including the steps of:

a) if the first and second nodes are both leaf nodes, then selecting the first and second nodes for joining;

b) if the first node is a leaf node and the second node is not a leaf node, then joining the first node with each child node of the second node; and c) if neither the first nor the second node is a leaf node, then:

i) joining each n-th child node of the first node with a corresponding n-th child node of the second node, n being from 1 to F, where F is the number of child nodes from each node of the tree except the leaf nodes;

ii) joining each n-th child node of the first node with an (n+1)-th child is node of the second node, n being from 1 to F−1; and iii) joining each n-th child node of the second node with an (n+1)-th child node of the first node, n being from 1 to F−1.

18. A computer program product for use with a multiprocessor system for directing the system to perform proximity joins on high-dimensional data points in parallel in the processors, the computer program product comprising:

a computer readable medium;

means, provided on the computer-readable medium, for directing the system to partition the data points among the processors;

means, provided on the computer-readable medium, for directing the system to create an index structure for the data points in each processor, the index structure having a plurality of leaf nodes each corresponding to a subset of the data points;

means, provided on the computer-readable medium, for directing the system to assign the join operations to the processors using the index structures; and means, provided on the computer-readable medium, for directing the system to simultaneously redistribute and join the data points in the processors in parallel, based on a predetermined joining condition.

19. The computer program product as recited in claim 18, wherein the means for directing to assign the joint operations includes:

means, provided on the computer-readable medium, for directing the system to determine a cost for each join operation; and means, provided on the computer-readable medium, for directing the system to assign the join operations to the processors based on the determined costs of the join operations.

20. The computer program product as recited in claim 19, wherein the means for directing to determine a cost for each join operation includes:

means, provided on the computer-readable medium, for directing each processor to traverse the respective index structure to determine a global size for each leaf node; and means, provided on the computer-readable medium, for directing the processor to estimate the cost from the global sizes of the leaf nodes involved in the join operation.

21. The computer program product as recited in claim 18, wherein:

the index structure is a multi-dimensional $\epsilon$-K-D-B tree having a root node branching into a plurality of interior nodes, the tree terminating with the leaf nodes; and the joining condition is such that the similarity distance between any two data points to be joined is at most $\epsilon$.

22. The computer program product as recited in claim 21, wherein the means for directing to create an index structure includes means, provided on the computer-readable medium, for directing each processor to split each leaf node of the respective structure, in at least one dimension of the tree, into $\lfloor 1/\epsilon \rfloor$ child nodes whenever the number of points in the leaf node exceeds a predetermined value, each child node having a width greater than $\epsilon$ in the dimension used for splitting.

23. The computer program product as recited in claim 22, wherein:

each leaf node of the $\epsilon$-K-D-B tree has a depth equal to one plus the number of interior nodes between the root node and leaf node; and the splitting of a leaf node is based on the depth of the leaf node.

24. The computer program product as recited in claim 22, wherein the means for directing to split a leaf node includes means, provided on the computer-readable medium, for directing the processor to determine an order of the dimensions used for splitting based on any correlation among the dimensions, such that a dimension selected for splitting next has the least correlation with previously selected dimensions.

25. The computer program product as recited in claim 24, wherein:

the multi-dimensional $\epsilon$-K-D-B trees for all the processors are structurally identical; and the processors have the same order of the dimensions used for splitting the leaf nodes.

26. The computer program product as recited in claim 22, further comprising:

means, provided on the computer-readable medium, for directing each processor to sort the data points of each respective leaf node using a dimension not used for splitting the leaf nodes as a common sort dimension; and for each pair of leaf nodes from which data points are to be joined, means, provided on the computer-readable medium, for directing the processor to sort-merge the data points associated with the pair based on the common sort dimension.

27. The computer program product as recited in claim 18, further comprising means, provided on the computer-readable medium, for directing each processor to communicate the index structure created by the processor to the other processors.

28. The computer program product as recited in claim 18, further comprising means, provided on the computer-readable medium, for directing each processor to broadcast asynchronously to the other processors as to which leaf nodes of the processor have recently been split.

29. The computer program product as recited in claim 18, further comprising means, provided on the computer-readable medium, for directing the system to distribute the data points asynchronously among the processors so that each processor has all the data points for the joint operations assigned to the processor.

30. The computer program product as recited in claim 29, wherein the means for directing to distribute includes means, provided on the computer-readable medium, for directing each processor to send the data points to the other processors in a depth-first order using the index structure of the processor.

31. The computer program product as recited in claim 29, further comprising means, provided on the computer-readable medium, for directing each processor to delete a leaf node in the processor if the leaf node is no longer needed for the join operations assigned to the processor.

32. The computer program product as recited in claim 18, wherein the means for directing to join the data points includes:
   means, provided on the computer-readable medium, for directing each processor to first join the leaf nodes for which the processor has received the data points needed for the joint operations assigned to the processor; and
   means, provided on the computer-readable medium, for directing the processor to delete those leaf nodes and data points from which the join operations have been performed by the processor.

33. The computer program product as recited in claim 18, wherein the means for directing to assign the join operations includes means, provided on the computer-readable medium, for directing each processor to traverse the respective index structure to determine the join operations that will be performed by the processor.

34. The computer program product as recited in claim 33, wherein:
   the index structure is a tree structure having a root node branching into a plurality of child nodes and terminating with the leaf nodes; and
   the computer program product further comprises means, provided on the computer-readable medium, for directing each processor to join a first node and a second node, the means for directing to join a first node and a second node including:
   a) means, provided on the computer-readable medium, for directing the processor to select the first and second nodes for joining if the first and second nodes are both leaf nodes;
   b) means, provided on the computer-readable medium, for directing the processor to join the first node with each child node of the second node if the first node is a leaf node and the second node is not a leaf node; and
   c) if neither the first nor the second node is a leaf node, then:
      i) means, provided on the computer-readable medium, for directing the processor to join each n-th child node of the first node with a corresponding n-th child node of the second node, n being from 1 to F, where F is the number of child nodes from each node of the tree except the leaf nodes;
      ii) means, provided on the computer-readable medium, for directing the processor to join each n-th child node of the first node with an (n+1)-th child node of the second node, n being from 1 to F−1; and
      iii) means, provided on the computer-readable medium, for directing the processor to join each n-th child node of the second node with an (n+1)-th child node of the first node, n being from 1 to F−1.

35. A database system for performing proximity joins on high-dimensional points in parallel in a multiprocessor computer, comprising:
   means for partitioning the data points among the processors;
   means, in each processor, for creating an index structure for the data points of the processor, the index structure having a plurality of leaf nodes each corresponding to a subset of the data points;
   means for assigning the join operations to the processors using the index structures; and
   means, in each processor, for simultaneously redistributing and joining the data points in the processors in parallel based on a predetermined joining condition.

36. The system as recited in claim 35, wherein the means for assigning the joint operations includes:
   means for determining a cost for each join operation; and
   means for assigning the join operations to the processors based on the determined cost of the join operations.

37. The system as recited in claim 36, wherein the means for determining a cost for each join operation includes:
   means for traversing the index structures in each processor to determine a global size for each leaf node; and
   means for estimating the cost from the global sizes of the leaf nodes involved in the join operation.

38. The system as recited in claim 35, wherein:
   the index structure is a multi-dimensional $\epsilon$-K-D-B tree having a root node branching into a plurality of interior nodes, the tree terminating with the leaf nodes; and
   the joining condition is such that the similarity distance between any two data points to be joined is at most $\epsilon$.

39. The system as recited in claim 38, wherein the means for creating an index structure includes means for splitting each leaf node, in at least one dimension of the tree, into $\lfloor 1/\epsilon \rfloor$ child nodes whenever the number of points in the leaf node exceeds a predetermined value, each child node having a width greater than $\epsilon$ in the dimension used for splitting.

40. The system as recited in claim 39, wherein:
   each leaf node of the $\epsilon$-K-D-B tree has a depth equal to one plus the number of interior nodes between the root node and leaf node; and
   the splitting a leaf node is based on the depth of the leaf node.

41. The system as recited in claim 39, wherein the means for splitting a leaf node includes means for determining an order of the dimensions used for splitting based on any correlation among the dimensions such that a dimension selected for splitting next has the least correlation with previously selected dimensions.

42. The system as recited in claim 41, wherein:
   the multi-dimensional $\epsilon$-K-D-B trees for all the processors are structurally identical; and
   the processors have the same order of the dimensions used for splitting the leaf nodes.

43. The system as recited in claim 39, further comprising:
   means, in each processor, for sorting the data points of each leaf node using a dimension not used for splitting the leaf nodes as a common sort dimension; and
   for each pair of leaf nodes from which data points are to be joined, means in each processor for sort-merging the data points associated with the pair based on the common sort dimension.

44. The system as recited in claim 35, further comprising means for communicating, by each processor to the other processors, the index structure created by the processor.

45. The system as recited in claim 35, further comprising means for broadcasting asynchronously, by each processor to the other processors, as to which leaf nodes of the processor have recently been split.

46. The system as recited in claim 35, further comprising means for distributing the data points asynchronously among the processors so that each processor has all the data points for the joint operations assigned to the processor.

47. The system as recited in claim 46, wherein the means for distributing includes means for sending the data points, by each processor to the other processors, in a depth-first order using the index structure of the processor.

48. The system as recited in claim 46, further comprising means for deleting a leaf node in each processor if the leaf node is no longer needed for the join operations assigned to the processor.

49. The system as recited in claim 35, wherein the means for joining the data points includes:

means for first joining the leaf nodes for which the processor has received the data points needed for the joint operations assigned to the processor; and means for deleting those leaf nodes and data points from which the join operations have been performed by the processor.

* * * * *